United States Patent
Cantu, II (10) Patent No.: US 9,025,742 B1
(45) Date of Patent: *May 5, 2015

(54) METHOD AND SYSTEM FOR PROVIDING TARGETED MESSAGES

(75) Inventor: Jose Jesus Cantu, II, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1852 days.

This patent is subject to a terminal disclaimer.

(21) Appl. No.: 11/761,230

(22) Filed: Jun. 11, 2007

Related U.S. Application Data (63) Continuation-in-part of application No. 11/538,410, filed on Oct. 3, 2006.

(51) Int. Cl.
*H04M 1/64* (2006.01)
*H04M 3/428* (2006.01)

(52) U.S. Cl.
CPC ............ *H04M 3/428* (2013.01); *H04M 3/4283* (2013.01); *H04M 3/4285* (2013.01)

(58) Field of Classification Search
CPC .. H04M 3/428; H04M 3/4283; H04M 3/4285
USPC .......................... 379/265.05, 265.02, 265.09, 379/265.11–265.13, 258, 266.01
See application file for complete search history.

(56) References Cited

U.S. PATENT DOCUMENTS

| | | | |
|---|---|---|---|
| 5,881,131 A * | 3/1999 | Farris et al. ................. | 379/15.03 |
| 5,946,387 A * | 8/1999 | Miloslavsky ............ | 379/265.12 |
| 6,363,411 B1 | 3/2002 | Dugan et al. | |
| 7,088,814 B1 | 8/2006 | Shaffer et al. | |
| 7,623,650 B2 | 11/2009 | Dalton et al. | |
| 7,672,444 B2 | 3/2010 | Perrella et al. | |
| 7,835,514 B1 * | 11/2010 | Snyder et al. ............ | 379/266.01 |
| 8,068,780 B2 | 11/2011 | Cohen | |
| 8,386,567 B2 * | 2/2013 | Roberts et al. ................ | 709/205 |
| 8,477,919 B2 * | 7/2013 | Sylvain ..................... | 379/201.03 |
| 8,537,986 B1 * | 9/2013 | Cantu, II ..................... | 379/88.23 |
| 2001/0014145 A1 | 8/2001 | Kamel et al. | |
| 2002/0049616 A1 * | 4/2002 | Speicher ........................... | 705/4 |
| 2003/0026404 A1 * | 2/2003 | Joyce et al. .............. | 379/144.01 |
| 2003/0156701 A1 * | 8/2003 | Burg et al. ................ | 379/215.01 |
| 2005/0286709 A1 * | 12/2005 | Horton et al. ............ | 379/265.09 |
| 2006/0074769 A1 * | 4/2006 | Looney et al. .................. | 705/26 |
| 2007/0201636 A1 | 8/2007 | Gilbert et al. | |
| 2007/0239537 A1 | 10/2007 | Protheroe et al. | |
| 2007/0269031 A1 | 11/2007 | Honig et al. | |

(Continued)

OTHER PUBLICATIONS http://telehold.com, (Aug. 18, 2006), 1 p.

(Continued)

*Primary Examiner* — Fan Tsang
*Assistant Examiner* — Van D Huynh
(74) *Attorney, Agent, or Firm* — Eric L. Sophir; Dentons US LLP (57) ABSTRACT

A method, system and apparatus for providing targeted messages. Engagement may be made in a communication session with a customer. An impact event indication may be received from the customer during the communication session. A targeted message may be obtained based on the impact event indication. A targeted message may be provided to the customer in response to the received impact event indication.

17 Claims, 10 Drawing Sheets

(56) References Cited

U.S. PATENT DOCUMENTS

| | | | |
|---|---|---|---|
| 2008/0119173 A1 | 5/2008 | Nguyen | |
| 2008/0195504 A1* | 8/2008 | Wren | 705/26 |
| 2009/0024453 A1 | 1/2009 | Fraser | |
| 2009/0099836 A1 | 4/2009 | Jacobsen et al. | |
| 2009/0182616 A1 | 7/2009 | Ho et al. | |
| 2009/0307074 A1 | 12/2009 | Sharma | |
| 2010/0188485 A1 | 7/2010 | Abrams | |
| 2010/0191602 A1 | 7/2010 | Mikkelsen et al. | |
| 2011/0261947 A1* | 10/2011 | Benefield et al. | 379/265.09 |

OTHER PUBLICATIONS http://www.easyonhold.com, (2005),7 p.
http://www.marketingonholdusa.com/, (Oct. 3, 2006),1 p.
http://www.ohms.com/ohms.htm, (Oct. 3, 2006),5 p.
"Custom Messaging on Hold Campaigns", http://voice.muzak.com/solutions/onhold/custom_messaging.aspx, (2006),2 p.
"On-Hold Music and Messages", http://www.business.com/directory/telecommunications/business_solutions/business_phone_systems/on-hold_music_and_messages/, (2006),8 p.
"Our Difference", http://www.onholdmarketing.com/ourdifference.htm, (Oct. 3, 2006),2 p.

* cited by examiner

METHOD AND SYSTEM FOR PROVIDING TARGETED MESSAGES

CROSS REFERENCE TO RELATED APPLICATION

This application is a continuation-in-part of U.S. patent application Ser. No. 11/538,410, filed on Oct. 3, 2006, which is herein incorporated by reference.

TECHNICAL FIELD

This application relates to systems and methods that manage communications, and more particularly to systems and methods that provide targeted messages.

BACKGROUND

When a customer interacts with an agent of a company with whom the customer is doing business, the customer may on occasion be offered an additional product or service of the company. The agent may decide whether to make the offer to the customer based on whether the customer currently has the product or service, whether the company is pushing the product or service, and the like.

SUMMARY

In an example embodiment, engagement may be made in a communication session with a customer. An impact event indication may be received from the customer during the communication session. A targeted message may be obtained based on the impact event indication. A targeted message may be provided to the customer in response to the received impact event indication.

In an example embodiment, engagement may be made simultaneously in a voice communication session and a data communication session with a customer. An impact event indication may be received from the customer during the voice communication session. A targeted message may be provided in the data communication session to the customer in response to the received impact event indication.

In an example embodiment, a life event indication regarding a customer may be obtained. A targeted message may be provided to the customer in response to the obtained life event indication.

In an example embodiment, a modification notation may be included in the customer information of a customer in a database. At least one targeted message may be accessed for the customer based on the modification notation. The at least one targeted message may be provided to the customer.

In an example embodiment, a communication session may be initiated. An impact event indication may be provided to an agent during the communication session. A targeted message may be received from the agent in response to the impact event indication. The targeted message may be presented to a customer.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this invention.

Figure 1:
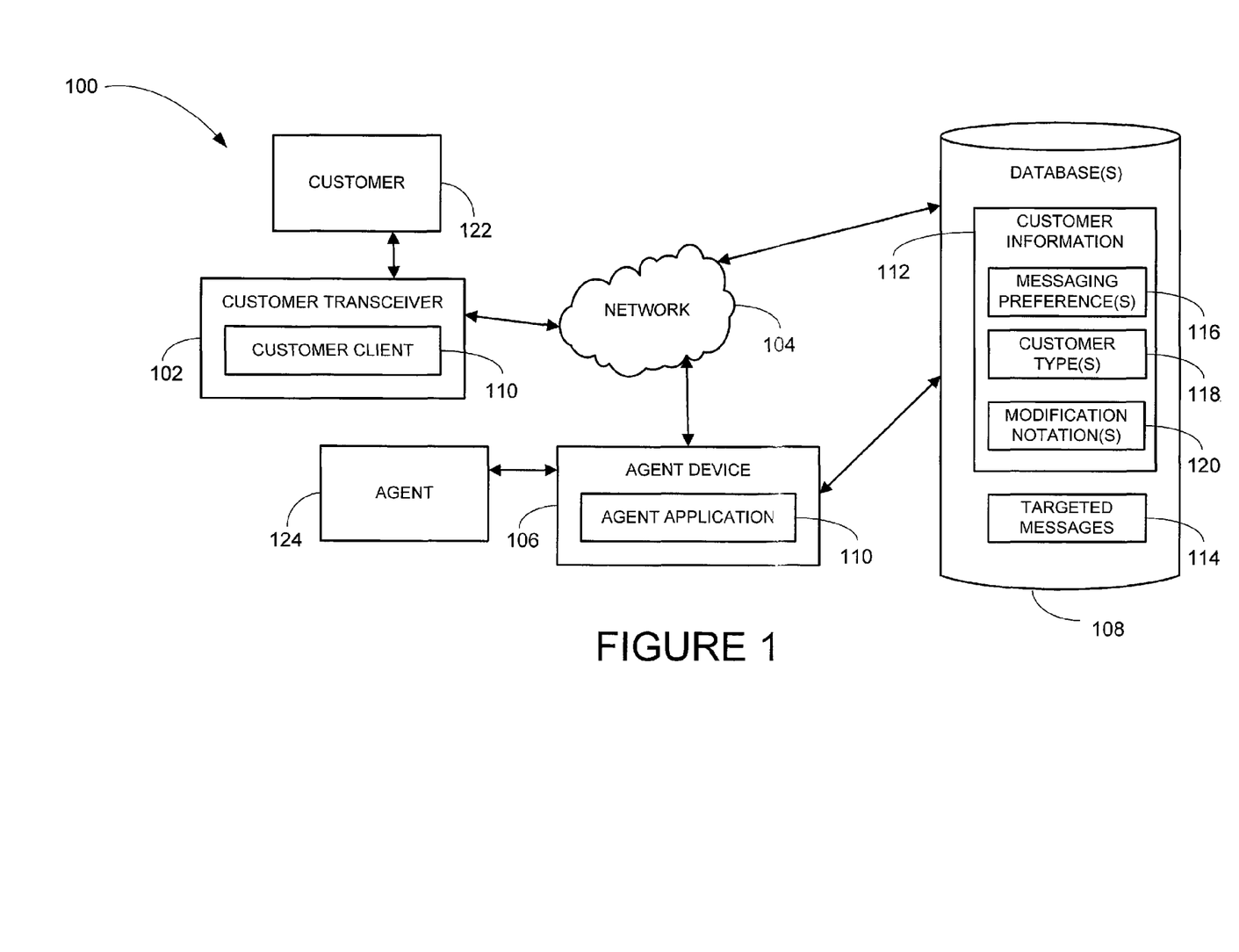
FIG. 1 is a block diagram of a system for targeted messaging according to an example embodiment.

FIG. 1 illustrates an example system 100 in which a customer 122 may use a customer transceiver 102 to interact in a communication session over a network 104 with an agent 124. The interaction between the customer 122 and the agent 124 may include: an audio conversation enabled over a Public Switched Telephone Network (PSTN), an audio conversation enabled over a Voice-over-IP (VoIP) link, an audio/video conversation over any suitable video-conferencing system, a text chat conversation enabled through an instant messenger (IM) or short message service (SMS) system, or any combination thereof. Specific examples are merely intended to be illustrative and not limiting in any manner, as any bi-direction flow of information between the customer 122 and the agent 124 may be used. Further, in the context of the present discussion, an interaction may be interrupted, during which time the interaction is suspended or is placed on hold. In some instances, the customer 122 may merely wait for further information from the agent 124. However, this suspension may be used as an opportunity to inform the customer 122 about other services that are offered or to provide entertainment to the customer 122, such as in the form of music.

The customer transceiver 102 used by the customer 122 to engage in the communication session may be a mobile phone, a personal digital assistant (PDA), a MP3 player, a laptop computer, or other wired or wireless devices. The customer transceiver 102 may include an optional display.

The network 104 over which the customer 122 may interact with the agent 124 may be a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The agent 124 may operate an agent device 106 to interact with the customer transceiver 102 operated by the customer 122. The agent device 106 may be a mobile phone, a personal digital assistant (PDA), a MP3 player, a laptop computer, or other wired or wireless device and may include an optional display. The customer transceiver 102 and the agent device 108 may be the same or different types of devices capable of communicating with one another.

The customer 122 may provide an impact event indication to the agent 124 during a communication session. The impact event indication indicates that the customer 122 has or may have an event occur that impacts the customer 122 (e.g., financially). The agent 124 may process the impact event indication with the agent device 106 and provide a targeted message to the customer 122 in response. The targeted message provided by the agent 124 may be an audio message, a graphical message, and/or a textual message. Other types of messages that are targeted to the customer 122 may also be used. Additional interactions between the customer 122 and the agent 124 may also occur during the communication session. For example, the customer 122 may query the agent 124 for information and be provided the queried information in response.

The agent 124 may use customer information 112 during a communication session. The customer information 112 may include a messaging preference 166, a customer type 118, and/or a modification notation 120 for the customer 122 or a plurality of customers 122 with whom the agent 124 interacts. Other types of information regarding the customer 122 may also be stored within the customer information 112. For example, the customer information 112 may include financial information, relationship information, familial relationship information, military rank, branch of service information, military activity status, mortgage information (e.g., mortgage rate, payoff amount, mortgage insurance company, mortgage term, and the like), insurance information, banking information, credit card information, and the like for the customer 122.

The messaging preference 116 may indicate whether the customer 122 has opted in or opted out of receiving targeted messages. The messaging preference 116 may be, by way of example, a flag indicating whether the customer 122 wishes to receive targeted messages or a series of flags indicating the types of targeted messages that the customer 122 wishes to receive.

The customer type 118 may indicate a type of the customer 122 as classified by the agent 124 or other organization. For example, the customer type 118 may indicate a length of years of the customer 122, shopping habits of the customer 122, military or organizational rank of the customer 122, and the like.

The modification notation 120 may relate to a life event of the customer 122. For example, the modification notation 120 may indicate availability of a new product from the agent 124 or that the customer 122 has had a life changing event (e.g., a new baby, marriage, divorce, or retirement).

The database 108 may also include a plurality of targeted messages 114. The plurality of targeted messages 114 may include advertisements, announcements, endorsements, and the like that have been prerecorded and stored in the database 108 to be selectively provided to the customer 122 when selection criterion is met. A targeted message may be selected for the customer 122 from the plurality of targeted messages 114 and/or dynamically generated for the customer 122 based on a received impact event indication.

Figure 2:
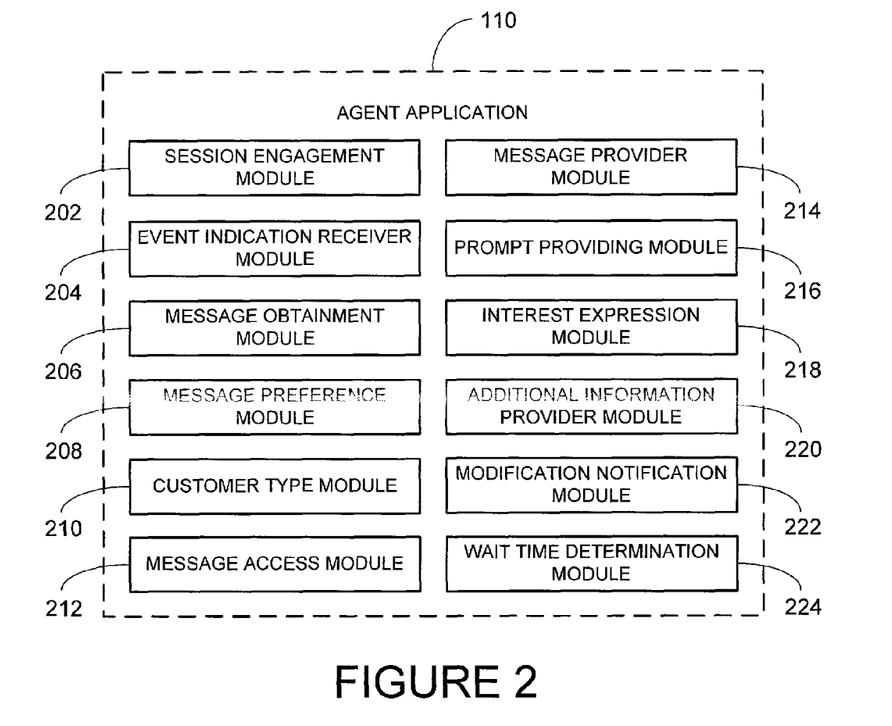
FIG. 2 is a block diagram of an example agent application.

FIG. 2 illustrates an agent application 110 (see FIG. 1) that may be deployed in the system 100 or another system in accordance with an example embodiment. The agent application 110 may include a session engagement module 202, an event indication receiver module 204, a message obtainment module 206, a message preference module 208, a customer type module 210, a message access module 212, a message provider module 214, a prompt providing module 216, an interest expression module 218, an additional information provider module 220, a modification notification module 222, and/or a wait time determination module 224. Other modules may also be used.

The session engagement module 202 engages the customer 122 in a communication session. The event indication receiver module 204 receives an impact event indication from the customer 122 during the communication session.

The message obtainment module 206 obtains a targeted message based on the impact event indication. The targeted message may be obtained by selecting a targeted message from the plurality of targeted messages 118 or dynamically generating a targeted message. The targeted message may include audio, graphics, video, and/or text. For example, the text of the targeted message may be pre-recorded or synthesized using a text-to-speech engine.

The message preference module 208 accesses the messaging preference 116 of the customer 122 from the database 108, while the customer type module 210 accesses the customer type 118 of the customer 122 from the database 108. The message access module 212 accesses a targeted message from among the plurality of targeted messages 114 of the database 108.

The message provider module 214 provides a targeted message to the customer 122 in response to the received impact event indication. The prompt providing module 216 provides a customer prompt to the customer 122. The customer prompt may request an interest expression from the customer 122 to the targeted message.

The interest expression module 218 receives the interest expression from the customer 122. The additional information provider module 220 provides additional information to the customer 122 in response to the received interest expression.

The modification notification module 222 accesses the modification notation 120 of the customer 122 from the database 108. The modification notification module 222 also modifies the customer information 112 of the customer 122 based on the received impact event indication and provides a modification indication into the customer information 112 based on the received impact event indication.

The wait time determination module 224 determines an estimated wait time for the customer 122 to interact with the agent 124 in a communication session.

Figure 3:
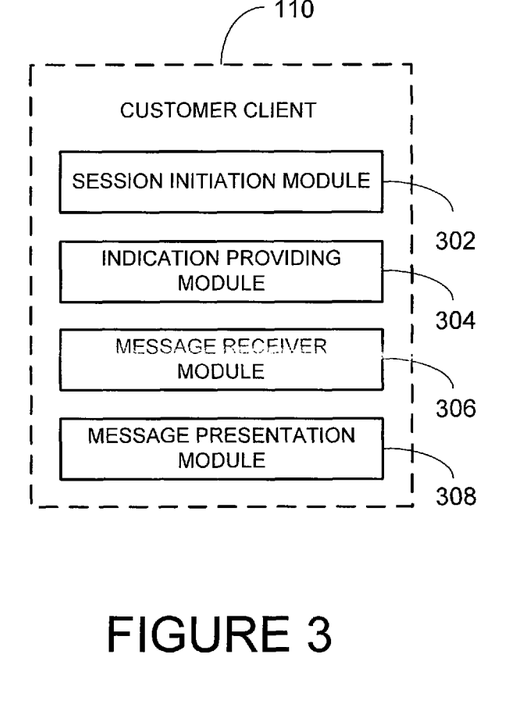
FIG. 3 is a block diagram of an example customer client.

FIG. 3 illustrates a customer client 110 (see FIG. 1) that may be deployed in the system 100 or another system in accordance with an example embodiment. The customer client 110 may include a session initiation module 302, an indication providing module 304, a message receiver module 306, and/or a message presentation module 308. Other modules may also be used.

The session initiation module 302 initiates a communication session with the agent device 106. The indication providing module 304 provides an impact event indication to the agent device 106 during the communication session. The message receiver module 306 receives a targeted message from the agent device 106 in response to the impact event indication. The message presentation module 308 presents the targeted message to the customer 122.

Figure 4:
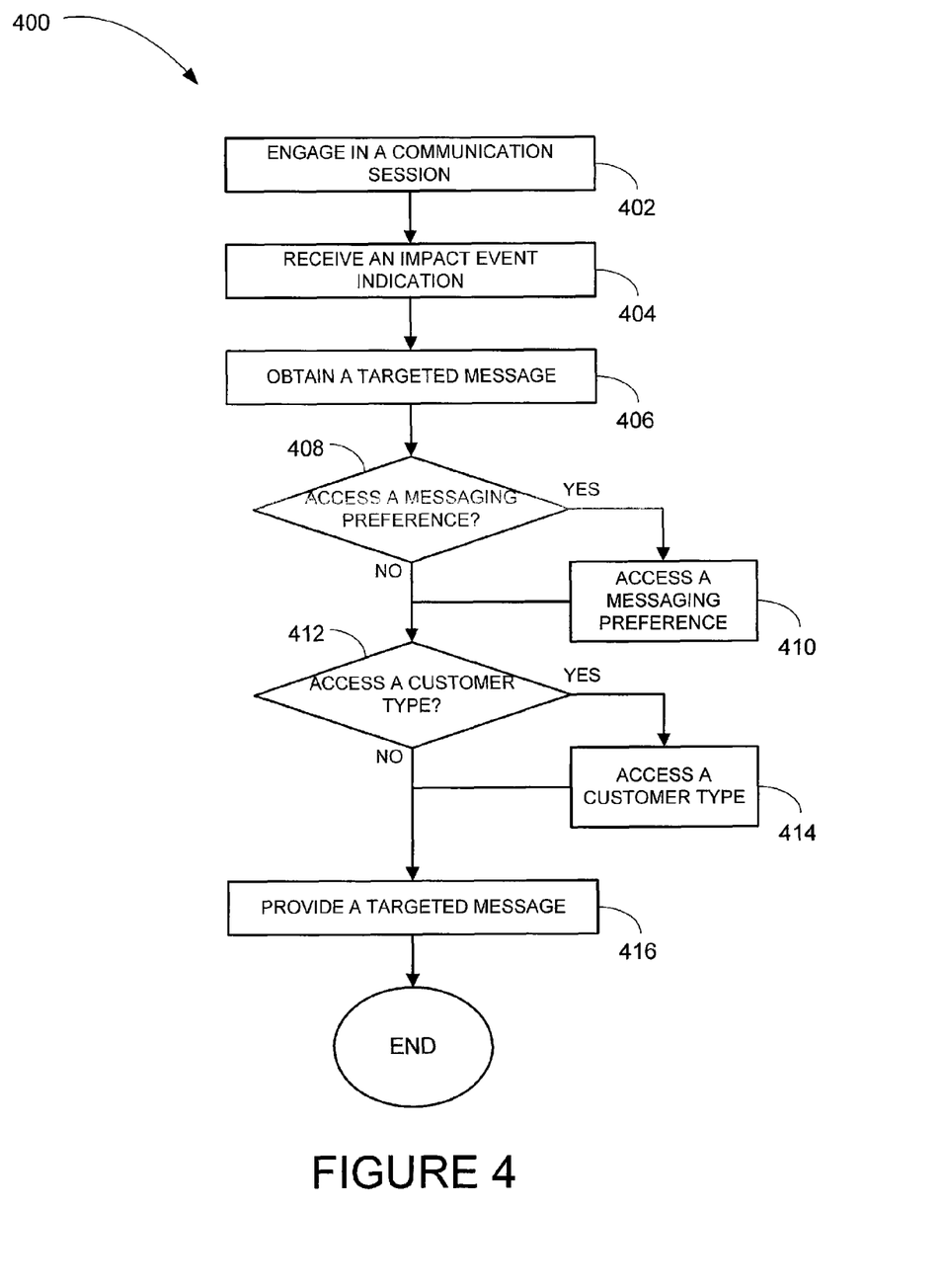
FIGS. 4-6 are flowcharts illustrating a method in accordance with an example embodiment for providing a targeted message.

FIG. 4 illustrates a method 400 for providing a targeted message according to an example embodiment. The method 400 may be performed by the agent application 110 (see FIG. 1) or a different application.

Engagement with the customer 122 in a communication session may be made through the customer transceiver 102 (see FIG. 1) at block 402. The engagement may be made by processing a login of the customer 122 accessing a website, connecting a voice communication session or video teleconferencing communication session, and the like. The engagement may also be made in other ways. The communication session may include, by way of example, a web communication session, video teleconferencing communication session, and/or a telephonic communication session.

In an example embodiment, the engagement may include receiving identifying information from the customer 122 and/or identifying the customer 122 using identifying information receiving during pre-engagement such as a phone number or an IP address from where the customer 122 is initiating the communication session. The identifying information may enable customer information 112 (see FIG. 1) to be retrieved from the database 108. The engagement may, in an example embodiment, include the customer 122 providing identification such as member identification (ID) or another identifier to obtain information regarding the customer 122 from the customer information 112.

An impact event indication may be received from the customer 122 during the communication session at block 404. The impact event indication indicates that an impact event has occurred and/or may occur for the customer 122. The impact event indication may be received from the customer 122 in response to one or more questions by the agent 124 requesting the customer 122 to update a portion of the customer information 112 associated with the customer 122 or may be received in other circumstances. The impact event indication may be received from the customer 122 directly through the customer transceiver 102 or indirectly through the agent 124 operating the agent application 110.

The impact event that may be indicated to the agent 124 may include a life event, a travel event, and/or a financial event. Other types of events may also be used.

A life event may include an event in the customer's life that has an effect on one or more financial products. Examples of such life events include, without limitation: permanent change of station, deployment, retirement, beginning college, birth of a baby, marriage, divorce, moving, completing college, change in employment, change in number of dependents, and the like. Financial products include: checking accounts, savings accounts, mortgages, certificates of deposit, credit cards, retirement accounts, life insurance accounts, health insurance accounts, brokerage accounts, mutual funds, equity lending accounts, auto insurance accounts, property insurance accounts, liability insurance accounts, commercial insurance accounts, commercial lending accounts, and the like. Broadly, financial products include any product that the customer 122 derives some present or future financial benefit from, or has some present or future liability. For example, in the case of auto insurance, the customer 122 pays a periodic premium and in the event of an accident that results in the total loss of the auto, will receive a payment meant to compensate the customer 122 for the loss of the auto.

A financial event may include a major purchase (e.g., purchase of a car or of a house), a car accident, a loss of a home, purchase of insurance, availability of insurance, and the like. By way of an example, a financial event indication received during the operations at block 404 may indicate that the customer 122 recently had a car accident.

A travel event may include a stay at a hotel or a purchase of an airline ticket, a cruise ticket, a rail ticket, or a theme park admission ticket, and the like. By way of an example, a travel event indication received during the operations at block 404 may indicate that the customer 122 plans to take a vacation at a family resort in Florida.

A targeted message may be obtained based on the received impact event indication at block 406. The targeted message may be obtained by selecting a targeted message from the plurality of targeted messages 114 (see FIG. 1) in the database 108 for the customer 122 based on the impact event indication or accessing the customer information 112 from the database 108 and dynamically generating a targeted message based on the impact event indication and optionally the accessed customer information 112 of the customer. By way of an example, a targeted message regarding increased life insurance coverage may be obtained for the customer 122 with existing life insurance that has recently had a new baby. Using a dynamically generated targeted message, the current life insurance coverage may be conveyed to the customer 122 and information about how much more coverage should be purchased with the new baby may be provided.

The targeted message optionally include instructions for the customer transceiver 102 to present the targeted message to the customer 122. For example, the instructions may cause the customer transceiver 102 to present the targeted message within a pop-up window of a web browser executed on the customer transceiver 102.

In an example embodiment, an identifying characteristic of the customer 122 may be used to obtain the targeted message during the operations at block 406. The identifying characteristic may include, by way of example: age, marital status, number of children, location, military rank, and the like. Other identifying characteristics of the customer 122 may also be used.

A determination may be made at decision block 408 whether the messaging preference 116 of the customer 122 is to be accessed. The messaging preference 116 may be accessed and used to determine whether the targeted message should be provided to the customer 122. If a determination is made to access the messaging preference 116 of the customer 122, the messaging preference 116 of the customer 122 may be accessed from the database 108 at block 410. If a determination is made not to access the messaging preference of the customer 122 at decision block 408 or upon completion of the operations at block 410, the method 400 may proceed to decision block 412.

At decision block 412, a determination may be made whether to access the customer type 118 of the customer 122. If a determination is made to access the customer type 118, the customer type 118 of the customer 122 may be accessed from the database 108. The customer type 118 may be accessed and used to determine whether the targeted message should be provided to the customer 122. For example, certain customer types (e.g., activity military) may generally seek targeted messages while other customers types (e.g., a spouse) may not. The targeted messages may be used to cross-market to certain types of customers, thereby increasing same customer sales. If a determination is made at decision block 412 not to access the customer type 118 of the customer or upon completion of the operations at block 414, the method 400 may proceed to block 416.

The targeted message may be provided to the customer 122 in response to the received impact event indication at block 416. The targeted message may be provided to the customer 122 electronically, via facsimile machine, or through postal mail. The targeted message may, in addition or alternatively, be provided to the customer 122 in other ways. In an example embodiment, the targeted message may be provided when the messaging preference 116 of the customer 122 indicates that the customer 122 will accept the targeted message and/or when the customer type 118 of the customer 122 meets a customer criterion.

The targeted message may be provided during a principal part of the communication session, during a pause in the communication session, or after completion of the communication session. For example, the targeted message may be provided during a period when the agent 124 has placed the customer 122 on hold and/or during a future communication session.

In an example embodiment, a targeted message may be queuing from among the plurality of targeted messages 114 in the database 108 during the operations at block 406 and the queued targeted message may then be provided in response to the received impact event indication at block 416. For example, the queuing of the targeted message may occur during the communication session and the targeted message may be provided after terminating the communication session.

Figure 5:
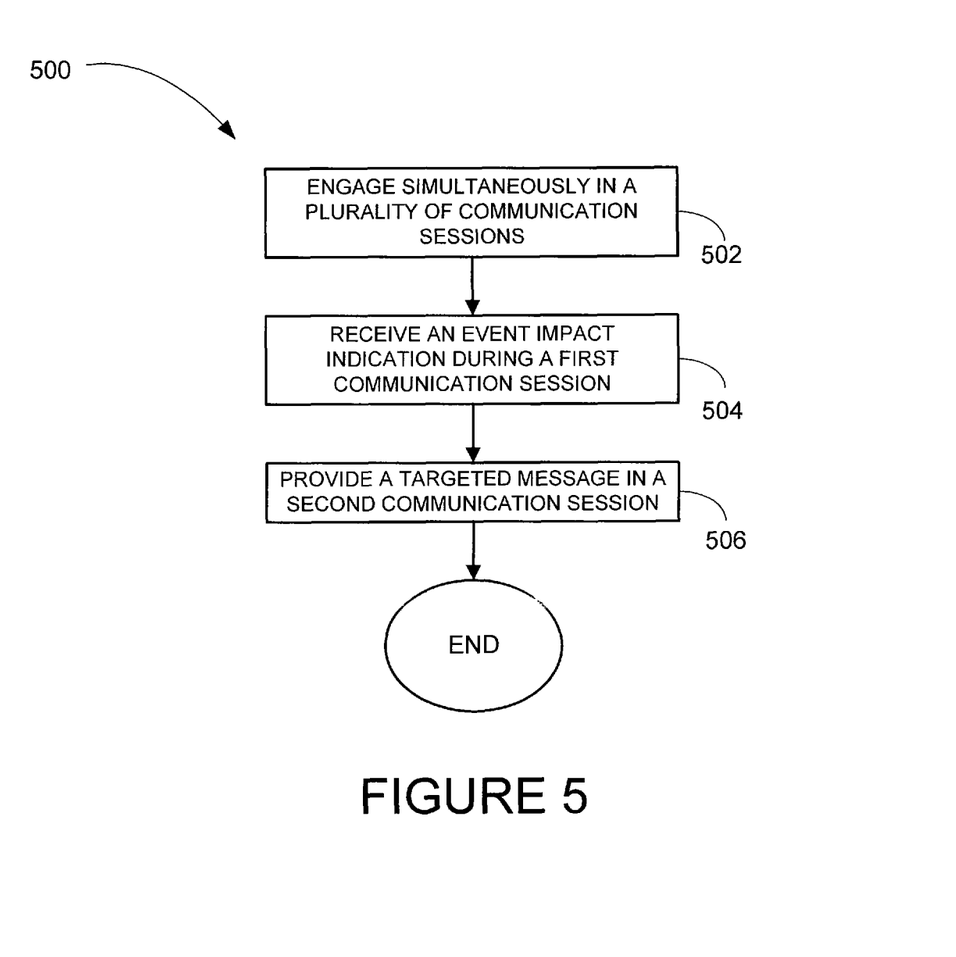

FIG. 5 illustrates a method 500 for providing a targeted message according to an example embodiment. The method 500 may be performed by the agent application 110 (see FIG. 1) or a different application.

An engagement may be made with the customer 122 simultaneously in a plurality of communication sessions (e.g., a voice communication session and a data communication session) at block 502. For example, the customer 122 may be using a first transceiver to speak with the agent 124 and a second transceiver to receive data from the agent 124.

An impact event indication may be received from the customer during a first communication session of the plurality of communication sessions (e.g., the voice communication session) at block 504.

A targeted message may be provided in a second communication session of the plurality of communication sessions (e.g., the data communication session) to the customer in response to the received impact event indication at block 506. A second targeted message is optionally provided in the first communication session. For example, an audio targeted message may be provided audibly in the second communication session while a visual targeted message is provided in the first communication session.

In an example embodiment, the second targeted message is optionally provided simultaneously with the first targeted message. For example, an audio targeted message may be provided while a visual targeted message is being simultaneously provided.

Figure 6:
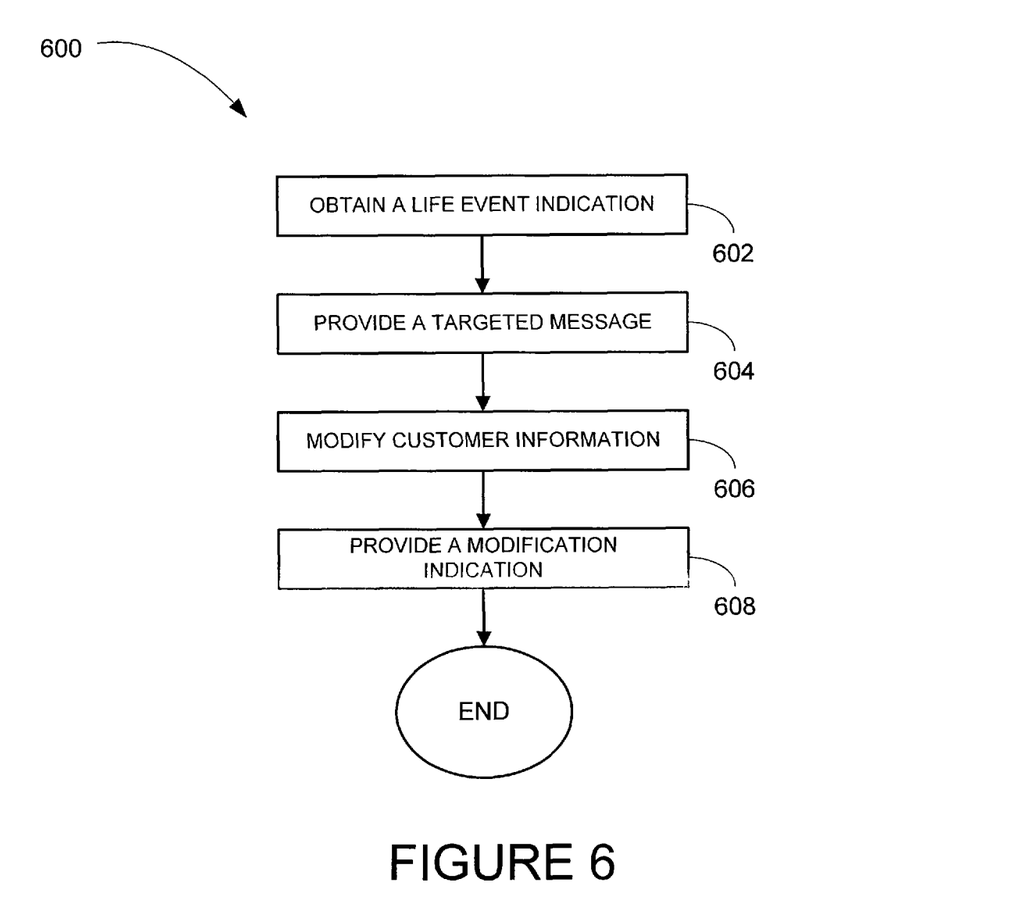

FIG. 6 illustrates a method 600 for providing a targeted message according to an example embodiment. The method 600 may be performed by the agent application 110 (see FIG. 1) or a different application.

A life event indication regarding the customer 122 may be obtained at block 602. The life event indication may, in an example embodiment, be received from the customer 122 or an additional customer with knowledge of the customer 122. The life indication may be obtained by accessing the customer information 112 of the customer 122 from the database 108 and comparing the customer information 112 against a system criterion to determine whether there is a life event indication regarding the customer 122.

In an example embodiment, the life event indication may be received from the customer 122 during an interaction with the agent 124. During the interaction, the agent interacting with the customer may notice one or more life events have occurred for the customer 122. This may be the result of the customer 122, on their own initiative, providing such an indication. The life event indication may be the result of active listening and further proving by the agent 124. By way of an example, the customer 122 may be trying to increase the insurance coverage on a home. During the interaction, the agent 124 can inquire as to the reason for the increase. One reason may be that an addition for a baby room is planned for the home. An engaged agent 124 may quickly ascertain that a baby is on the way for that particular customer 122 and input such a life event indication into the customer information 112.

A targeted message may be provided to the customer 122 in response to the obtained life event indication at block 604.

The customer information 112 of the customer 122 in the database 108 is optionally modified based on the received impact event indication at block 606. The modification notation 120 is optionally modified based on the received impact event indication at block 608. The modification of the modification notation 120 may enable the agent 124 to detect changes to the customer information 112 to provide the customer 122 with one or more targeted messages based on the modification. The operations at blocks 604, 606, and 608 may occur in any order.

Figure 7:
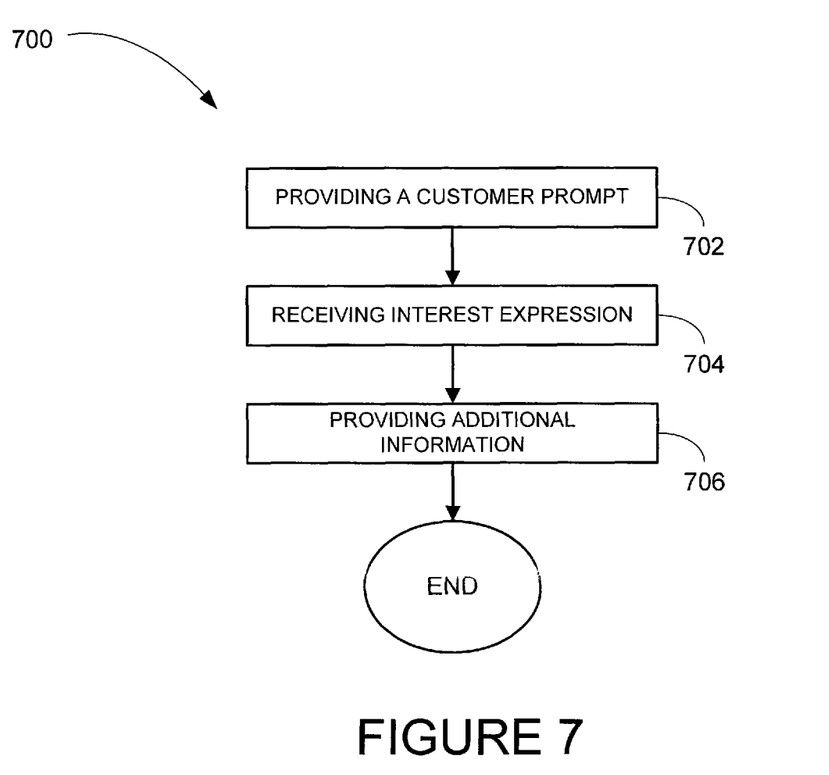
FIG. 7 is a flowchart illustrating a method in accordance with an example embodiment for providing additional information.

FIG. 7 illustrates a method 700 for providing additional information according to an example embodiment. The method 700 may be performed by the agent application 110 (see FIG. 1) or a different application. In an example embodiment, the method 700 may be performed upon the completion of the operations at block 416, block 506, or block 604 (see FIGS. 4-6).

A customer prompt may be provided to the customer 122 at block 702. The customer prompt may be provided upon completion of providing the targeted message or simultaneously during the providing of a targeted message. The customer prompt may request an interest expression (e.g., an expression of interest) from the customer 122 to a targeted message. The customer prompt may be a request to press a particular button on or code in a telephone, make a certain selection in a window of a user interface, and the like to receive additional information regarding information provided in the targeted message. An interest expression may be received from the customer at block 704.

Additional information may be provided to the customer 122 in response to the received interest expression at block 706. The additional information may be provided asynchronously or synchronously (e.g., after interaction with the customer 122 has terminated) from the targeted message. For example, the additional information may be delivered next time the customer logs onto a website, through postal mail, e-mail, a text message, or a facsimile. The additional information may be a coupon, text, video, audio, and the like.

Figure 8:
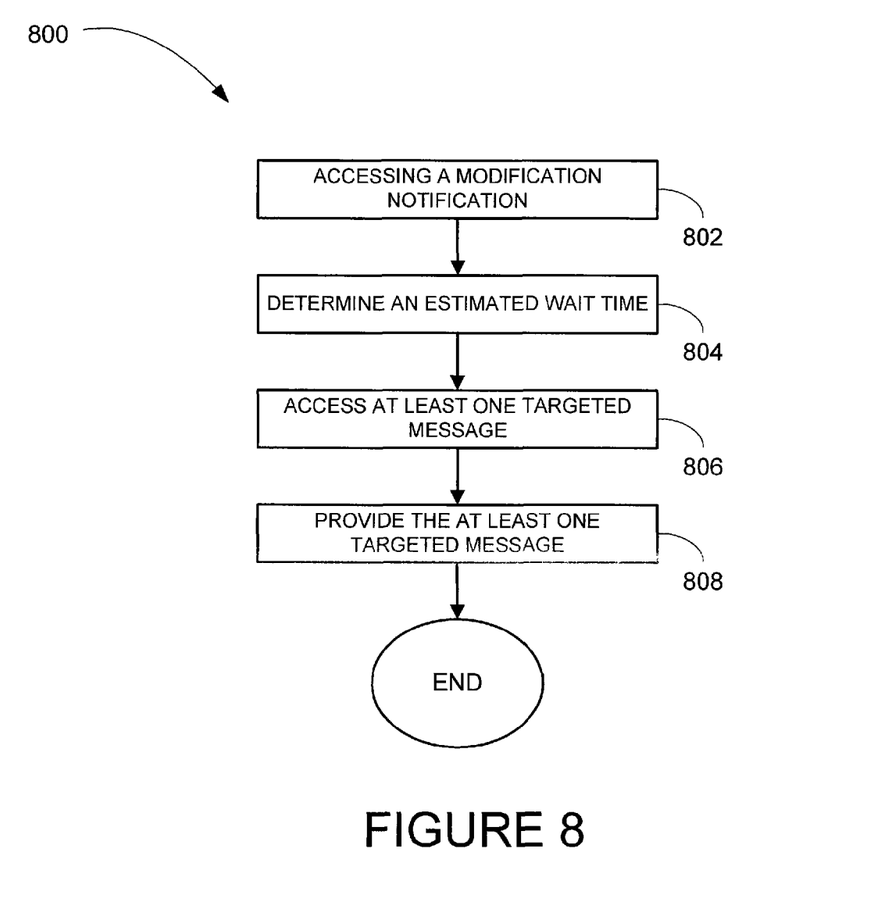
FIG. 8 is a flowchart illustrating a method in accordance with an example embodiment for providing a targeted message.

FIG. 8 illustrates a method 800 for providing a targeted message according to an example embodiment. The method 800 may be performed by the agent application 110 (see FIG. 1) or a different application.

The modification notation 120 (see FIG. 1) within the customer information 112 may be accessed from the database 108 at block 802. In an example embodiment, the agent 124 may modify the modification notation 120 in the database 108 for the customer 122 based on a life event indication or other indication received during a communication session.

An estimated wait time for the customer 122 to interact (e.g., speak) with the agent 124 in a communication session may be determined at block 804. The estimated wait time may be for a communication session to begin or resume. For example, the wait time may occur while the customer 122 is on hold waiting to interact with the agent 124.

At least one targeted message may be accessed for the customer 122 based on the modification notation 120 and optionally the estimated wait time at block 806.

In an example embodiment, at least one targeted message of the plurality of targeted messages 114 may be selected for the customer 122 from the database 108 based on the estimated wait time and the life event information. Alternatively, at least one targeted message may be dynamically generated for the customer 122 based on the estimated wait time and the life event information.

The accessed targeted message may be provided to the customer 122 at block 808. Music or other filler is optionally provided to the customer 122 during a remaining portion of estimated wait time.

Figure 9:
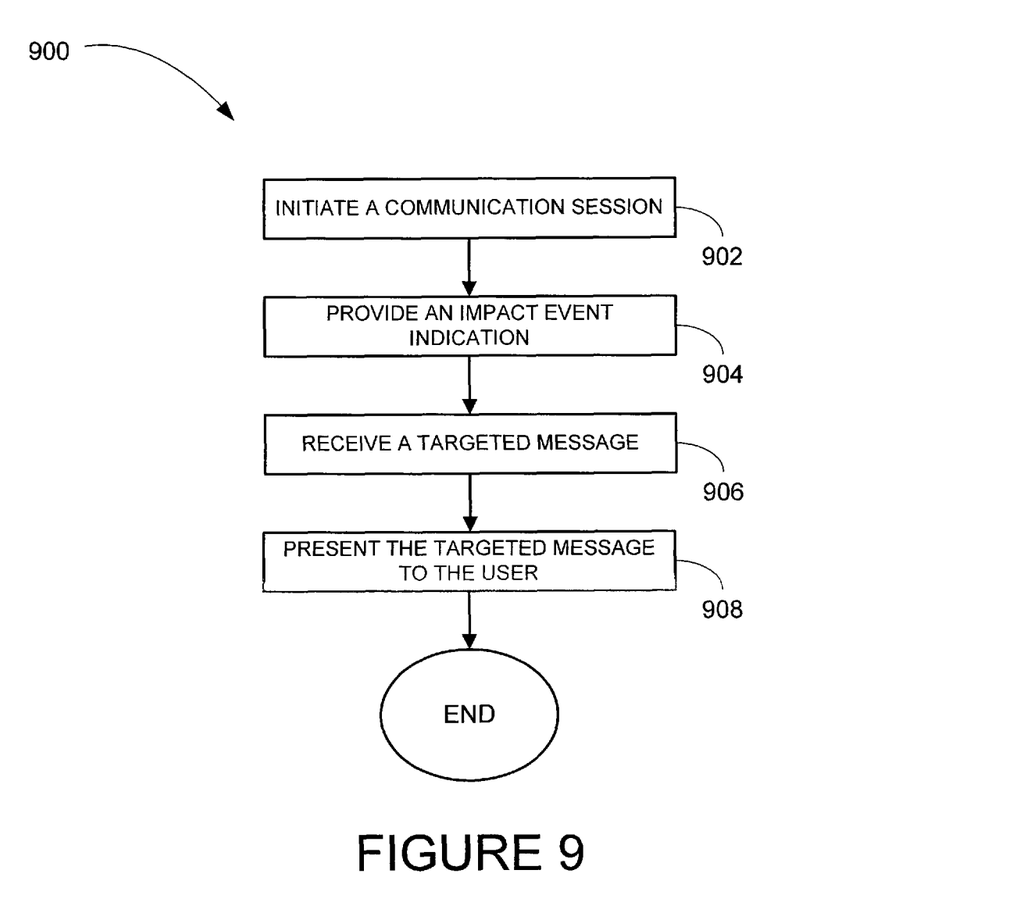
FIG. 9 is a flowchart illustrating a method in accordance with an example embodiment for receiving a targeted message.

FIG. 9 illustrates a method 900 for receiving a targeted message according to an example embodiment. The method 900 may be performed by the customer transceiver 102 (see FIG. 1) or another device.

A communication session may be initiated with the agent 124 (see FIG. 1) at block 902. The communication session may be initiated by logging into a website, placing a telephone call or video teleconference, and the like.

An impact event indication may be provided to the agent 124 during the communication session at block 904. A targeted message may be received from the agent device 106 in response to the impact event indication at block 906.

The targeted message may be provided to the customer 122 at block 908. The targeted message may be presented audibly, through a web interface, or otherwise provided to the customer 122. For example, the targeted message may be provided in a pop-up window on the web interface of the customer transceiver 102 (see FIG. 1).

Figure 10:
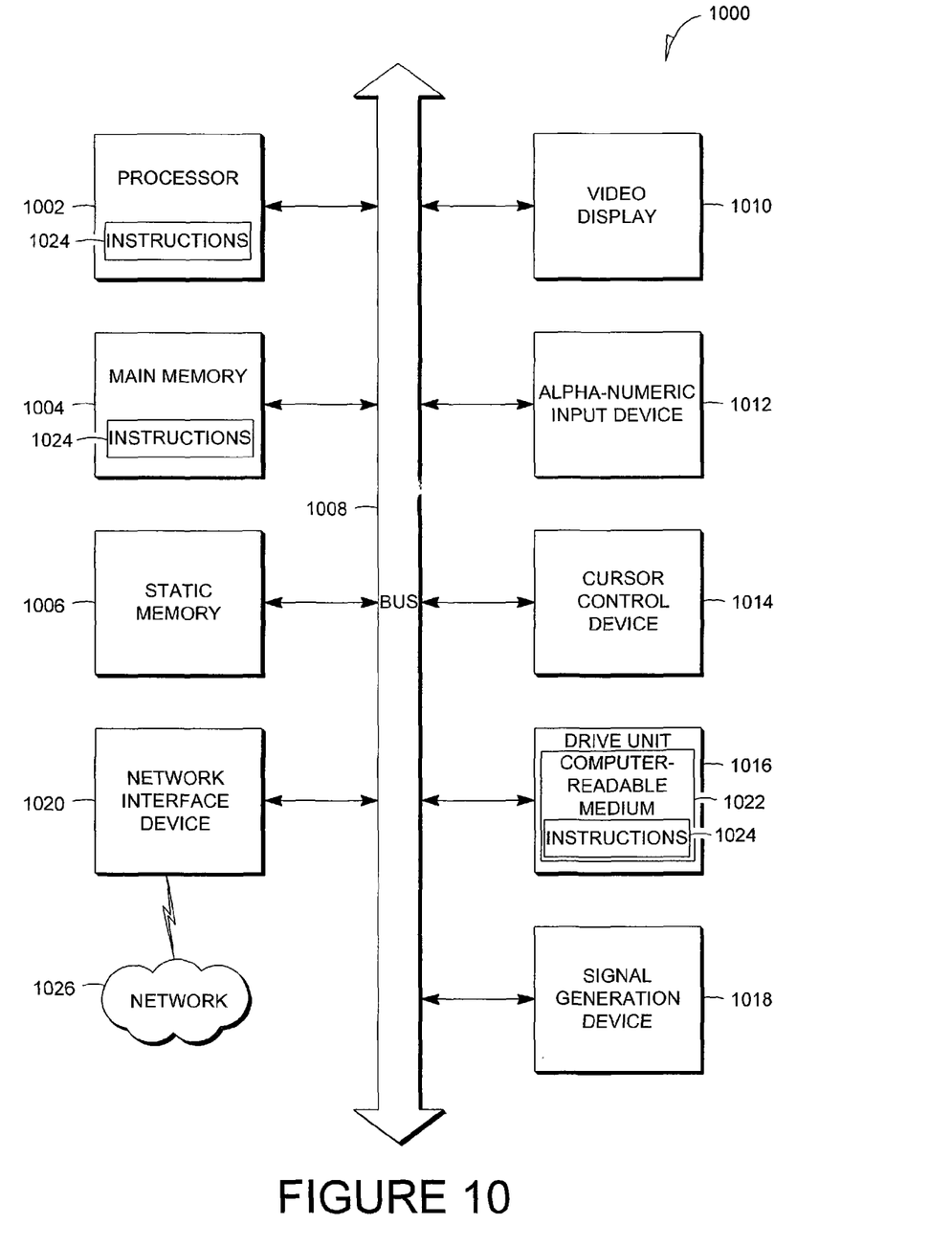
FIG. 10 illustrates a diagrammatic representation of machine in the example form of a computer system within which a set of instructions, for causing the machine to perform any one or more of the methodologies discussed herein, may be executed.

FIG. 10 shows a diagrammatic representation of machine in the form of a computer system 1000 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a car audio device, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The processor 1002 may represent a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 1002 may execute instructions and includes that portion of the computer system 1000 that controls the operation of the entire computer system 1000.

The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The cursor control device 1014 may be a keyboard, mouse or other pointing device, trackball, touchpad, touch screen, keypad, microphone, voice recognition device, or any other appropriate mechanism for the customer to input data to the computer 1000 and manipulate the customer interface previously discussed. Although only one input device 1014 is shown, in another embodiment any number and type of input devices may be present.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020. The network 1026 may be any suitable network and may support any appropriate protocol suitable for communication to the computer system 1000. In an embodiment, the network 1026 may support wireless communications. In another embodiment, the network 1026 may support hard-wired communications, such as a telephone line or cable. In another embodiment, the network 1026 may support the Ethernet IEEE (Institute of Electrical and Electronics Engineers) 802.3x specification. In another embodiment, the network 1026 may be the Internet and may support IP (Internet Protocol). In another embodiment, the network 1026 may be a local area network (LAN) or a wide area network (WAN). In another embodiment, the network 1026 may be a hotspot service provider network. In another embodiment, the network 1026 may be an intranet. In another embodiment, the network 1026 may be a GPRS (General Packet Radio Service) network. In another embodiment, the network 1026 may be any appropriate cellular data network or cell-based radio network technology. In another embodiment, the network 1026 may be an IEEE 802.11 wireless network. In still another embodiment, the network 1026 may be any suitable network or combination of networks. Although one network 1026 is shown, in other embodiments any number of networks (of the same or different types) may be present.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The computer system 1000 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer system 1000. For example, other peripheral devices such as audio adapters or chip programming devices, such as EPROM (Erasable Programmable Read-Only Memory) programming devices may be used in addition to, or in place of, the hardware already depicted.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A non-transitory machine-readable storage medium comprising instructions, which when executed by a machine, cause the machine to:
engage, by a server with a device associated with a customer, in a communication session with the customer;
receive, by the server from the device associated with the customer, an impact event indication from the customer during the communication session;
obtain, by the server from an agent server, a targeted message based on the impact event indication and determine a length of time to provide the targeted message to the customer;
suspend, by the server with the device associated with the customer, the communication session;
determine, by the server, an estimated call wait time of the suspended communication session based on an expected time to wait before the customer can be connected to an agent;
dynamically select and provide, by the server to the device associated with the customer, the targeted message during the suspension of the communication session to the customer based on the estimated wait time and the impact event indication while the customer waits in response to the received impact event indication when the length of time to provide the targeted message to the customer does not exceed the estimated call wait time before the customer can be connected to the agent; and
resume, by the server with the device associated with the customer, the communication session after the targeted message has been completely played.

2. The non-transitory machine-readable storage medium of claim 1, wherein providing a targeted message causes the machine to:
access a messaging preference of the customer from a database; and
provide a targeted message to the customer in response to the received impact event indication when the messaging preference indicates that customer will accept the targeted message.

3. The non-transitory machine-readable storage medium of claim 1, wherein providing a targeted message causes the machine to:
access a customer type of the customer from a database; and
provide a targeted message to the customer in response to the received impact event indication when the customer type meets a customer criterion.

4. The non-transitory machine-readable storage medium of claim 1, wherein the impact event indication includes at least one of a life event indication, a travel event indication, or a financial event indication.

5. The non-transitory machine-readable storage medium of claim 1, wherein the communication session includes at least one of a web communication session, video teleconferencing communication session or a telephonic communication session.

6. The non-transitory machine-readable storage medium of claim 1, wherein the targeted message is sent to the customer electronically, via facsimile machine, or through postal mail.

7. A non-transitory machine-readable storage medium comprising instructions, which when executed by a machine, cause the machine to:
obtain, by a server from a device associated with a customer, a life event indication regarding a customer during a communication session;
determine, by the server, a targeted message based on the life event indication and a length of time to provide the targeted message to the customer;
suspend, by the server with a device associated with the customer, the communication session;
determine, by the server, an estimated call wait time of the suspended communication session based on an expected time to wait before the customer can be connected to an agent;
dynamically select and provide, by the server to the device associated with the customer, a targeted message during the suspension of the communication session to the customer based on the estimated wait time and the life event indication while the customer waits in response to the obtained life event indication when the length of time to provide the targeted message to the customer does not exceed the estimated call wait time before the customer can be connected to the agent; and resume, by the server with the device associated with the customer, the communication session after the targeted message has been completely played.

8. The non-transitory machine-readable storage medium of claim 7, wherein obtaining causes the machine to:
receive a life event indication regarding a customer.

9. The non-transitory machine-readable storage medium of claim 7, wherein obtaining causes the machine to:
access customer information of a customer from a database; and
compare the customer information against a system criterion to determine whether there is a life event indication regarding the customer.

10. The non-transitory machine-readable storage medium of claim 7, further comprising instructions, which when executed by a machine, cause the machine to:
provide a customer prompt to the customer, the customer prompt requesting an interest expression from the customer to the targeted message.

11. The non-transitory machine-readable storage medium of claim 10, further comprising instructions, which when executed by a machine, cause the machine to:
receive the interest expression from the customer; and
provide additional information to the customer in response to the received interest expression.

12. The non-transitory machine-readable storage medium of claim 7, further comprising instructions, which when executed by a machine, cause the machine to:
modify customer information of the customer in a database based on the obtained life event indication; and
provide a modification indication into the customer information based on the obtained impact event indication.

13. A non-transitory machine-readable storage medium comprising instructions, which when executed by a machine, cause the machine to:
access, by a server from an agent server, a modification notation within customer information of a customer from a database, wherein the modification notation is based on an impact event indication from the customer received during a communication session;
access, by the server, at least one targeted message for the customer based on the modification notation and determine a length of time to provide the targeted message to the customer;
suspend, by the server with a device associated with the customer, the communication session;
determine, by the server, an estimated call wait time of the suspended communication session based on an expected time to wait before the customer can be connected to an agent;
dynamically select and provide, by the server to the device associated with the customer, the at least one targeted message during the suspension of the communication session to the customer based on the estimated wait time and the impact event indication while the customer waits in response to the received impact event indication when the length of time to provide the targeted message to the customer does not exceed the estimated call wait time before the customer can be connected to the agent; and
resume, by the server with the device associated with the customer, the communication session after the at least one targeted message has been completely played.

14. The non-transitory machine-readable storage medium of claim 13 wherein accessing causes the machine to:
determine an estimated wait time for the customer to speak with an agent in a voice communication session; and
access at least one targeted message for the customer based on the estimated wait time and the modification notation.

15. The non-transitory machine-readable storage medium of claim 13, wherein accessing causes the machine to:
selecting at least one targeted message for the customer from the database based on an estimated wait time and the impact event indication.

16. The non-transitory machine-readable storage medium of claim 13, wherein the modification notation relates to a life event of the customer.

17. The non-transitory machine-readable storage medium of claim 1, wherein the targeted message includes at least one of an audio message, a graphical message, or a textual message.

* * * * *